J. LEE.
Hub-Boring Machine.
No. 166,788. Patented Aug. 17, 1875.
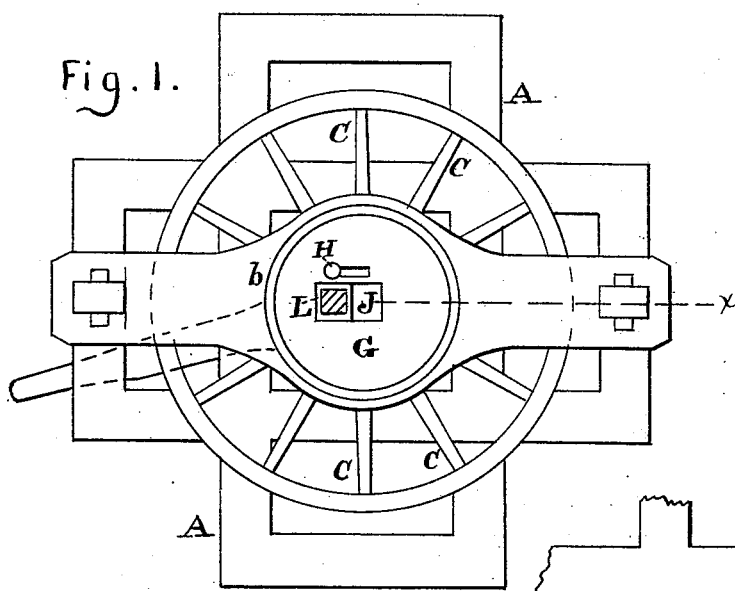
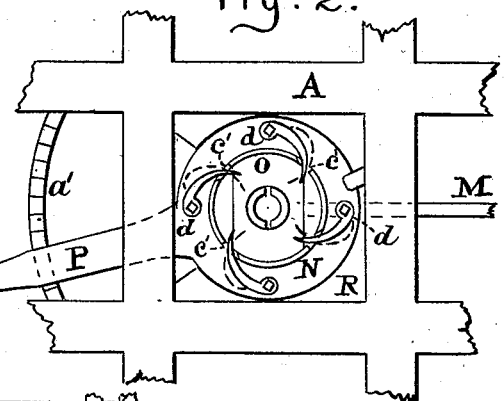
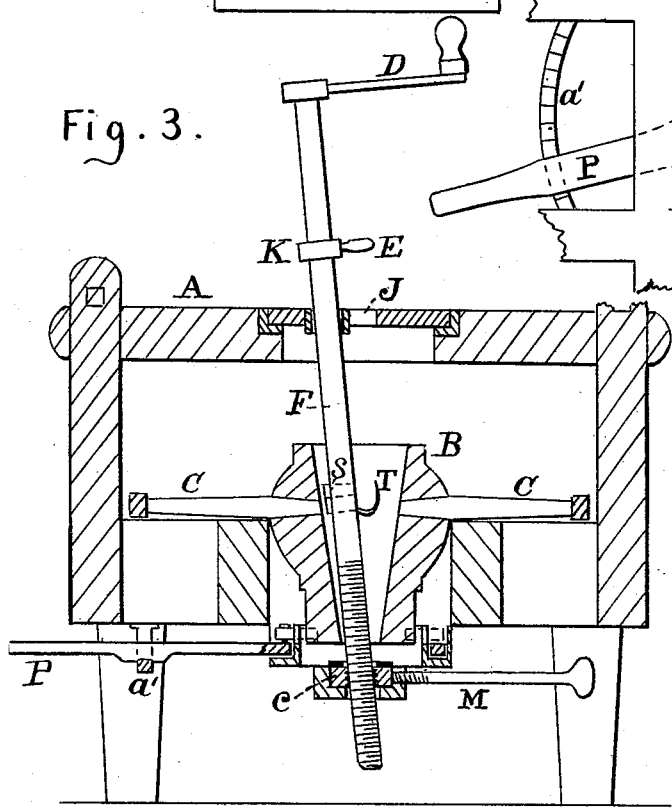
Witnesses
H. Anthon
B. R. Gage
Inventor:
John Lee
By W. Ruvris
Attorney

UNITED STATES PATENT OFFICE.

JOHN LEE, OF LYONS, IOWA.

IMPROVEMENT IN HUB-BORING MACHINES.

Specification forming part of Letters Patent No. 166,788, dated August 17, 1875; application filed July 6, 1875.

*To all whom it may concern:*

Be it known that I, JOHN LEE, of Lyons, in the county of Clinton and State of Iowa, have invented certain new and useful Improvements in Hub-Boring Machines; and I do hereby declare that the following is a full, clear, and exact description thereof, which will enable others skilled in the art to which it pertains to make and use the same, reference being had to the accompanying drawings and to the letters of reference marked thereon, which form a part of this specification.

Figure 1 is a top view. Fig. 2 is a vertical section on line $x\ x$ of Fig. 1. Fig. 3 is a top view of the centering devices.

My invention consists of a machine having devices for centering the wheel, and for boring a conical hole in the hub for the axle-box, as hereinafter described.

A is a frame to hold the wheel, and to which are attached the centering and boring devices. B represents the hub, and C the spokes, of a wheel, adjusted on the frame in position for boring the box-hole. D is the crank to the shaft carrying the auger-bit or cutter. E is a set-screw to hold the guide-collar K on the cutter-shaft F, to regulate the depth of the hole to suit any shoulder on the axle-box. G is a circular plate adjusted to revolve in its seat $b$ on the top of the frame. H is a set-screw to hold the guide-collar L on the shaft F in position in plate G, to adjust the shaft in slot J to any required inclination to enable the bit to cut a conical hole in the hub. M is a set-screw to adjust the open nut $c$, through which passes the lower end of the shaft F. N is a movable ring, adjusted to slide in its seat in plate R. O is a circular guide to the ring N, which guide is provided with notches $c'$, in which are adjusted the dogs $d$, the outer ends of which are pivoted to the movable ring N, so that as the ring is moved the dogs slide back and forth through the slots. P is a lever attached to the ring N, and provided with a lug or edge on the lower side to engage the teeth on the ratchet-bar $a'$, to hold the lever and dogs in position. S is a key to hold the cutter or bit T in the shaft. The cutter is made circular or gouge shape, as seen in the drawings.

The centering device is opened by drawing the lever forward, which moves the dogs outward; and the wheel to be bored being placed on the frame, with the small end of the hub downward, the lever is moved backward, which presses the ends of the dogs against the sides of the small end of the hub, clamping and holding it with its center directly under the center of the circular plate G. The wheel is then clamped in this position to the frame, and the shaft is adjusted through collar L in plate G, and the lower end through the hub and open nut $c$, which is properly adjusted by the set-screw M; and the collar L is adjusted in slot J in position to give the upper end of the shaft any required inclination, causing the shaft as it is revolved by the crank to gyrate, enabling the bit to cut the conical hole in the hub.

The screw-threads on the lower end of the shaft, working in the nut $c$, draw the shaft downward as it is revolved until the stop-collar K, set to gage the depth of the cut, comes in contact with the top of plate G, when the nut $c$ is opened by unscrewing set-screw M, and the shaft is raised and readjusted.

What I claim as new in machines for boring tapering or conical holes is—

1. The self-centering device consisting of the movable ring N, having lever P and pivoted dogs $d$, in combination with circular guide O, having notches $c'$, substantially as described.

2. In combination with the guide-plate G, having slot J, set-screw H, and collar L, the self-centering devices consisting of the movable ring N, pivoted dogs $d$, circular guide O, having notches $c'$, and lever P, substantially as described.

In testimony that I claim the foregoing as my own invention I affix my signature in presence of two witnesses.

JOHN LEE.

Witnesses:
WM. W. SANBORN,
A. J. LEFFINGWELL.